Patented Jan. 30, 1940

2,188,341

UNITED STATES PATENT OFFICE 2,188,341

PROCESS FOR THE MANUFACTURE OF ABRASIVE ARTICLES

Ernst Elbel and Fritz Seebach, Erkner, near Berlin, Germany, assignors, by mesne assignments, to Behr-Manning Corporation, Troy, N. Y., a corporation of Massachusetts No Drawing. Application December 24, 1931, Serial No. 583,145. In Germany December 30, 1930

11 Claims. (Cl. 51—280)

Abrasive papers and the like are in general so prepared that on a base, for example, paper or linen, any type of adhesive is applied on which the emery powder is sprinkled or pressed. The adhesive to be used has to combine various characteristics. In the first place it should be flexible so that the abrasive paper conforms well to the object operated upon without detachment of the abrasive layer. In the next place the adhesive should be quite water-resistant and should not soften, as this decreases the efficiency of the abrasive paper.

We have observed that abrasive papers thereby including cloth or other suitable fabric base, of remarkable flexibility and resistance will be obtained if in their manufacture hardenable resinous products which are used as adhesives obtained by digesting phenol-aldehyde resins and fatty oils to a homogeneous condition. Hardenable condensation products, for example, resoles prepared from cresol and formaldehyde in the presence of ammonia, can be heated with completely or partly oxidized air drying oils, preferably in the presence of a solvent or solvent mixture, dissolving both components, until the condensation products and the air drying oils begin to homogenize. According to another method hardenable phenol-aldehyde condensation products or resoles can be heated with tung oil in the presence of liquids, as for example methyl-cyclohexanol or acetone which dissolve both materials and permit the combination of resoles with tung oil at a temperature below 150°. According to a third method novolaks can be dissolved in fatty air drying oils by heating and converting them while in solution into hardenable resins by the action of hardening agents. After the fusion has taken place in the presence of solvents, the solvents can be distilled off wholly or partly from the product obtained. Instead of the resoles one can also use their derivatives, for example acetyl-derivatives of the resoles. Before, during or after the preparation of the composite products of hardenable resins and fatty oils, other resins, for example natural or synthetic resins can be added to them. The composite products embodying hardenable resins in resole condition can be used as such; one may also proceed by heating the composite products for example to the B condition or a less polymerized condition, and using them in this pre-hardened condition in the manner described hereafter.

As an illustration a resinous product as described above for example one dissolved in wood alcohol or in spirit benzol, is applied to a base material and the abrasive is then sprinkled on it. A continuous paper sheet so treated can be dried in an oven, for example at approximately 110° C. One may even operate by running the base material over a metal plate heated from below or interiorly by means of a gas flame; care is to be taken that the paper runs in close contact to the heated plate as for example by means of a wooden roller. The higher the temperature of the heated plate, the more rapidly can the abrasive paper be run as a continuous sheet over the heating device. The resinous binder can be sprayed on the base not only as a solution but also as an emulsion. One can also spray the abrasive powder on the base together with the dissolved resin, or one can mix the abrasive with the dissolved resin before spraying. Finally the process can also be carried out by sprinkling not only the powdered abrasive on the base, but also the pulverized resinous binder, either successively or simultaneously after mixing them in the usual manner. Instead of emery one can, of course, also use other suitable abrasives, and one can use the binders as specified in mixture with other well-known binders. Organic or inorganic dyes, plasticizers, or fireproofing materials may also be added to the mixture of resinous binders and abrasives.

We claim:

1. Process of preparing an abrasive article which comprises applying to a flexible base abrasive grains and a binder including a heat-hardening composition of a phenol-aldehyde resin brought into homogeneous solution with a drying oil, and heating to cause setting of the binder to a solid film characterized by adherence, flexibility, water resistance and freedom from softening.

2. Process of preparing an abrasive article which comprises applying to a flexible base abrasive grains and a binder including a heat-hardening composition of a phenol-aldehyde resin brought into homogeneous solution with a drying oil in the presence of a common solvent, removing the solvent, and heating to cause setting of the binder to a solid film characterized by adherence, flexibility, water resistance and freedom from softening.

3. Process of preparing an abrasive article which comprises applying to a flexible base abrasive grains and a binder including a heat-hardening composition of a phenol-aldehyde resin brought into homogeneous solution with an oxidized drying oil, and heating to cause setting of the binder into a solid film characterized by adherence, flexibility, water resistance and freedom from softening.

4. Process of preparing an abrasive article which comprises applying to a flexible base abrasive grains and a binder of a fusible phenol-aldehyde resin brought into homogeneous solution with a drying oil and converted to a heat-hardening composition by means of a hardening agent, and heating to cause setting of the binder to a solid film characterized by adherence, flexibility, water resistance and freedom from softening.

5. Abrasive article comprising a flexible base, abrasive grains and a binder for securing the grains to the base, said binder comprising a heat-hardened solid composition of a phenol-aldehyde resin brought into homogeneous solution with a drying oil and characterized by adherence, flexibility, water resistance and freedom from softening.

6. Abrasive article comprising a flexible base, abrasive grains and a binder for securing the grains to the base, said binder comprising a heat-hardened solid composition of a phenol-aldehyde resin brought into homogeneous solution with an oxidized drying oil and characterized by adherence, flexibility, water resistance and freedom from softening.

7. Abrasive article comprising a flexible base, abrasive grains and a binder for securing the grains to the base, said binder comprising a heat-hardened solid composition of a phenol-aldehyde resin brought into homogeneous solution with tung oil and characterized by adherence, flexibility, water resistance and freedom from softening.

8. An abrasive article of the nature of sandpaper comprising a composite sheet of flexible backing material, a layer of abrasive particles, and a binder uniting said particles to the backing material, said binder comprising a polymerized complex of a phenol aldehyde reaction product in homogeneous solution with a drying oil.

9. An abrasive article of the nature of sandpaper comprising a composite sheet of flexible backing material, a layer of abrasive particles, and a binder uniting said particles to the backing material, said binder comprising a polymerized and oxidized complex of a phenol aldehyde reaction product in homogeneous solution with a drying oil.

10. A process for producing an article of the nature of sandpaper which comprises applying to a flexible backing material abrasive particles and a binding composition comprising a phenol aldehyde reaction product in homogeneous solution with a drying oil, and polymerizing the binding composition.

11. A process for producing an article of the nature of sandpaper which comprises applying to a flexible backing material abrasive particles and a binding composition comprising a phenol aldehyde reaction product in homogeneous solution with a drying oil, and polymerizing and oxidizing the binding composition.

ERNST ELBEL.
FRITZ SEEBACH.